A. J. MEIER.
CONFECTION.
APPLICATION FILED DEC. 5, 1910.

996,024.

Patented June 20, 1911.

2 SHEETS—SHEET 1.

Witnesses:
William H. Bruseke.
Harry H. Peiss.

Inventor:
Albert J. Meier.
By Hugh K. Wagner
His Attorney.

A. J. MEIER.
CONFECTION.
APPLICATION FILED DEC. 5, 1910.

996,024.

Patented June 20, 1911.

2 SHEETS—SHEET 2.

Witnesses:
William H. Brueske.
Harry H. Peiss.

Inventor:
Albert J. Meier,
By Hugh K. Wagner
His Attorney.

UNITED STATES PATENT OFFICE.

ALBERT JOHN MEIER, OF GLENDALE, MISSOURI.

CONFECTION.

996,024.

Specification of Letters Patent.    Patented June 20, 1911.

Application filed December 5, 1910. Serial No. 595,623.

*To all whom it may concern:*

Be it known that I, ALBERT J. MEIER, a citizen of the United States, residing at Glendale, in the county of St. Louis and State of Missouri, have invented certain new and useful Improvements in Confections, of which the following is a specification.

This invention relates to food articles, and has for its object to provide an improved article of food that is suitable for use as an article of dessert, or breakfast food, and which can be formed from dough of which crackers are made, or from dough of which zwieback, bread, or cake and the like is made.

With this object in view the present invention consists in arranging a plurality of strips of dough into a crisscross or crib-like form and cooking same in any suitable manner to produce a delicious, attractive, and inexpensive article of food.

Figure 1:
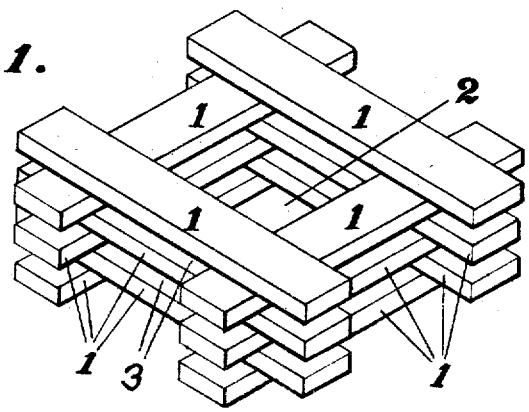
Figure 2:
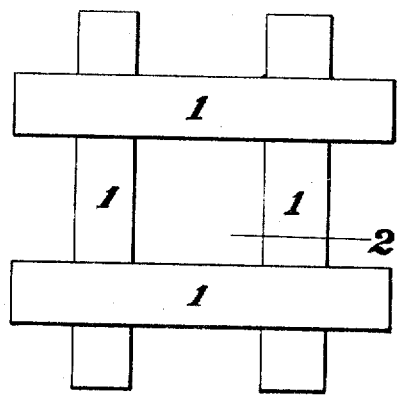
Figure 3:
Figure 4:
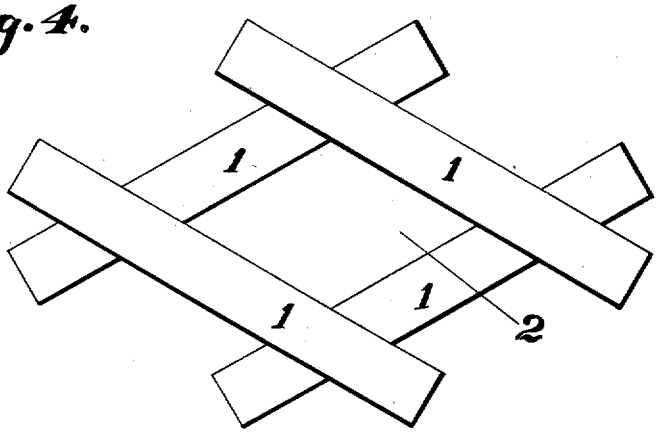

In the accompanying drawings forming part of this specification, in which like numbers of reference denote like parts wherever they occur, Figure 1 is a perspective view of my improved article of food; Fig. 2 is a top plan view of same; Fig. 3 is a side elevation of same; Fig. 4 is a top plan view of an alternate form of the article; and Fig. 5 is a top plan view of an alternate form of the article.

The article is formed of dough or other suitable material that is rolled or pressed into a sheet or layer, after which the strips 1 are cut or otherwise formed therefrom. The strips 1 are preferably arranged in layers of twos, one layer resting upon another and extending crosswise thereof in order to form a crisscross or crib-like article, which is then cooked in any suitable manner. When the article is cooked the strips 1 adhere to each other at their points of crossing and thereby retain their crisscross relation. The strips 1 of each layer are preferably spaced apart so as to leave an open space 2 in the middle of the article. As the strips 1 only engage each other at their points of crossing, the heat is allowed to circulate between said strips and thereby cooks same more thoroughly and quicker than an article formed of one piece of material.

Figure 5:
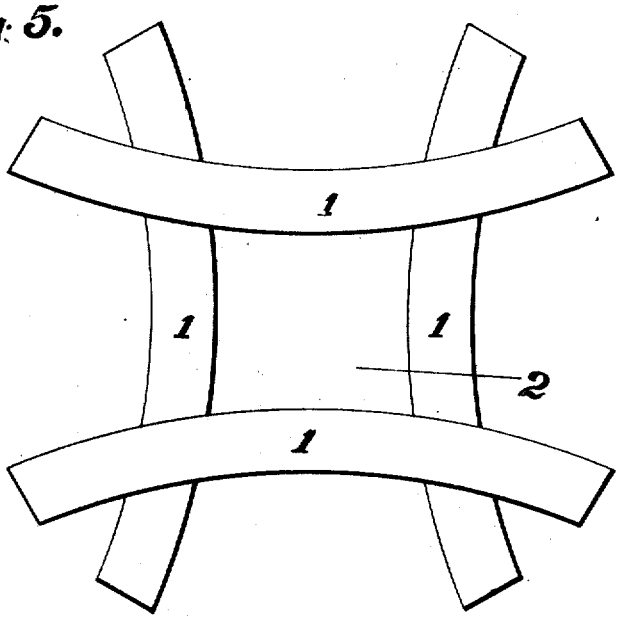

The strips 1 can be straight and arranged so as to form opening 2 with any desired configuration, such, for example, as a rectangular opening as depicted in Fig. 2, or a diamond-shaped opening as illustrated in Fig. 4, and, if desired, said strips can be curved as depicted in Fig. 5, or formed with any other desired shape. It should be understood, also, that the article can be formed of any number of layers of strips 1.

The ingredients of the material of which the strips 1 are formed can be varied so as to render the article suitable for use as an article of dessert, breakfast food, cracker, toast, zwieback, cake, candy, and other eatables. When the article is used for dessert, breakfast food, etc., cream, sauce, or the like, can be used therewith, and, by reason of the spaced relation of the strips 1, the cream, sauce, or the like, can circulate between and around said strips so as to moisten each of same. The opening 2 can be filled with fruit, whipped cream, or other desired filling, thus producing a delicious and attractive article of food.

Strips 1, are arranged in pairs, the pairs being disposed in superimposed order.

Opening 2, it will be observed, extends centrally and vertically through the article, serving during the cooking or baking operation to form a heat flue through which the heat passes or courses upwardly and in so passing through the opening obviously intimately contacts with the inner sides of strips 1, which define opening 2, resulting in a thorough baking of the inner sides of the strips. The spaces between the upper face of an under strip and the lower or bottom face of an upper strip provide a multiplicity of transverse or horizontal heat flues 3 disposed at right angles to the central vertical flue 2. Thus the top and bottom face of each strip excepting at their points of contact, and the sides and ends thereof are subjected to the maximum heat efficiency of the cooking agent, the latter not only surrounding the article, but in addition entering the horizontal flues 3, and the central vertical flue 2, coursing upwardly in the latter.

I claim:

1. An article of food comprising a body formed with a central opening which extends through the top and bottom of the body and which provides a heat flue in the cooking operation and further formed with a series of transverse openings which form transverse heat flues communicating with the central flue.

2. An article of food comprising a series of layers of food material, each layer comprising a pair of spaced cooked strips of food material, said pairs being arranged in superimposed relation, a lower pair being disposed transverse to an upper pair to define a central vertical space which forms a vertical heat flue during the cooking operation, and further forming a series of transverse heat receiving flues between alternate layers which transverse flues communicate with the central flue to permit the heat to have access to the tops, bottoms, sides and ends of each of the strips except at their points of mutual contact which points of contact form connections between the strips uniting them into an integral mass.

In testimony whereof I hereunto affix my signature in the presence of two witnesses.

ALBERT JOHN MEIER.

Witnesses:
GLADYS WALTON,
GEORGE G. ANDERSON.